Patented June 12, 1934

1,962,996

UNITED STATES PATENT OFFICE 1,962,996

TREATMENT OF SEEDS FOR SOWING

Josef Müller, Weissenstein above the Drau, Austria

No Drawing. Application October 9, 1933, Serial No. 692,908. In Austria October 20, 1932

20 Claims. (Cl. 47—58)

The present invention relates to improvements in the treatment of seeds for sowing.

An object of this invention is to destroy noxious organisms and to increase the sprouting energy of seeds, to vitalize the seeds and to strengthen them.

Another object is to get a stronger development of the plants generated from the seeds, and to increase the yield of the harvest. Furthermore the invention aims at preventing the seeds during storage from becoming musty and mouldy.

In my prior Patent No. 1,927,988 I have disclosed a process for the treatment of seeds for sowing with true percompounds such as hydrogen peroxide, peroxides or per-salts, according to which process the seeds are subjected to the action of said compounds for a protracted period, for instance for more than one hour up to several hours, when using hydrogen peroxide solutions or aqueous suspensions of solid peroxides or per-salts, or several days to months when using dry peroxides or per-salts. The concentration of hydrogen peroxide solutions used for this treatment as a rule varies from 0.5 to 2% $H_2O_2$, even though it was stated that a lower or higher concentration may be used if demanded by the nature or kind of the seeds.

The present invention relates to a process for the treatment of seeds for sowing with hydrogen peroxide, true per-salts or true peroxides, which consists substantially in that the material is moistened with solutions, the concentration of which corresponds to a hydrogen peroxide content of more than 3%. Solutions are preferably used, the concentration of which corresponds to a hydrogen peroxide content of 10 to 40% or more. According to a special method of carrying out the process hydrogen peroxide vapor may be used in place of hydrogen peroxide solutions.

It has been unexpectedly discovered that even concentrated hydrogen peroxide solutions, which effectively destroy noxious organisms, do not exercise an injurious action on the germinating energy of the seeds of most plants, but on the contrary revivify and invigorate the seeds and produce a good development of the plants (similarly to the action of a long treatment with dilute $H_2O_2$ solutions). At the same time the appearance of the seeds is also improved, a bleaching and beautifying of the seeds being produced at the same time. Any existing musty or mouldy smell is completely eliminated.

It is, however, an essential condition when using concentrated solutions of hydrogen peroxide that the action should be limited to the surface of the seeds. This implies the condition that only as much liquid should be brought in contact with the seeds as is sufficient for moistening the surfaces, that is to say any liquid in excess of such a quantity should be avoided. For this reason, the treatment of seeds with concentrated hydrogen peroxide solutions should be carried out by methods which allow small quantities of solution to be spread in as uniform a manner as possible over the whole material to be treated. The simplest method is to bring a suitably limited quantity of the solution on the material and immediately afterwards to distribute the liquid in the material quickly and uniformly by shaking, shovelling or like mechanical mixing processes. The liquid is brought in contact with the seeds preferably in an atomized state or in the state of mist. In general the quantity of the liquid to be used for pickling the seeds will under these circumstances be less than 15% of the weight of the seeds. The hydrogen peroxide may also be caused to act on the material in the form of vapor.

When the hydrogen peroxide comes in contact with the seeds, a strong catalytic reaction takes place on the surface and leads to a considerable generation of heat. If desired, the decomposition may be assisted by catalysts previously applied to the material, such as for instance copper or iron salts. An increased decomposition effect can also be obtained by using hydrogen peroxide in the form of alkaline solutions. On the other hand, the decomposition can be delayed by using hydrogen peroxide in the form of acid solutions. This appears advantageous in cases in which the seeds in themselves have a very strong decomposing action. Similar effects could also be obtained by first submitting the material to a pre-treatment with alkaline or acid solutions.

As is well known, the stinking smut or the flag smut of wheat (Tilletia caries or tritici), the hard smut of barley (Ustilago hordei), the loose smut of oats (Ustilago avenae) and the rye stalk smut (Urocystis occulta) can also be fought by means of the well known pickling agents whilst on the contrary such pickling liquids have practically no effect at all on the loose smut of wheat (Ustilago tritici) and the loose smuts of barley (Ustilago nuda). This is due to the fact that the exciters of the wheat and barley loose smut are concealed in the grain itself and therefore are not reached by the pickling liquids washing the grain outside. These smut spores are destroyed only by the action of water at 54° C. for about 10 minutes. The catalytic decomposition of the hydrogen peroxide causes a heating of the mixture which produces the same effect as hot water pickle and thus reaches even the spores in the deep places.

As the decomposition of per-compounds is accompanied by a considerable generation of heat, according to a preferred method of carrying out the process such a small quantity of liquid may be used that the liquid is evaporated by the heat generated, owing to which immediately after the treatment a material is obtained which can be used or stored without any further drying. This possibility is a further and a very important advantage of the process.

An effect similar to that of concentrated hydrogen peroxide solutions is obtained also with concentrated solutions of true per-salts or true peroxides. Among the per-salts may be mentioned as particularly suitable per-carbonates, per-sulphates or per-phosphates, per-arsenates and compounds of the system sodium sulphate-$H_2O_2$. Among the peroxides may be mentioned as particularly suitable: calcium peroxide, magnesium peroxide, barium peroxide, strontium peroxide. The well known organic per-compounds such as for instance the compounds of the system urea-$H_2O_2$ (per-carbamide) or compounds of the system hexamethylentetramine-$H_2O_2$ may also be used. These per-compounds may also be combined with one another. Also, known pickling agents (for instance mercury salts or organic mercury compounds) and/or fertilizing agents may be added to the oxygen-generating substances.

*Examples*

(1) 25 kg. wheat (winter or summer seeds) are placed in a shaking apparatus in contact with 1 litre hydrogen peroxide solution containing 200 gr. $H_2O_2$ per litre. After shaking for a short time decomposition commences and becomes perceptible owing to the crackling and heat generating. The grains are not only rendered bright on the surface, but cleaned even to the finest cracks and crevices. A strong smell of fresh wheat is produced. The decomposition of the hydrogen peroxide ceases after 20-30 minutes and this indicates also the end of the pickling process. The grains come out of the shaking apparatus practically dry and can be used at once for sowing. The seeds can also be stored at once. In the latter case it is, however, advisable to aerate them for several hours on the floor or also in the sun, in order completely to eliminate the pickling agent. Appreciable quantities of liquid will disappear even after a short treatment in the shaking apparatus. The treated grains have a very fine light color.

(2) 25 kg. barley are treated with 1 litre of a 40% hydrogen peroxide solution (400 gr. $H_2O_2$ per litre) which in addition contains 2% sublimate ($HgCl_2$). The shaking or mixing must continue until a uniform distribution of the liquid is ensured. The reaction takes place in a manner similar to that described in Example 1.

The combination of hydrogen peroxide with an additional disinfectant produces the highest cleaning and disinfecting action, because hydrogen peroxide, apart from its destroying action on injurious organisms, conveys all the impurities and pests to the surface and thereby greatly facilitates the work of the disinfectant. Such combinations are used more particularly in the case of an increased danger of infection. The seeds may be submitted, either moist or dry, to a preliminary pickling with a catalytically acting disinfectant such as for example copper sulphate.

(3) 10 kg. rye are treated with ¼ litre of a 30% hydrogen peroxide solution as in Example 1 or 2. A perfectly pure, light-colored and good smelling seed material with a very good sprouting energy is obtained.

(4) 1 kg. rape seed is pickled with 30 cc. of a 10% hydrogen peroxide solution. A pure, fresh smelling seed material of light color is obtained which comes up very well.

(5) For pickling vegetable seeds, such as for instance salad seeds, 3-5% hydrogen peroxide solutions are preferably used, in a quantity of 2-10% of the weight of the seeds. The seeds are cleaned by the treatment and given a better sprouting capacity.

(6) For seeds of all kinds of vegetables and for seeds of flowers a treatment with concentrated solutions of inorganic or organic per-salts is also advantageous. First, for instance, 2-5% of the per-salt in question, referred to the weight of the seeds, is mixed dry whereupon 2-5%, that is to say, the same quantity, of water is added with stirring. When using difficultly soluble peroxides or per-salts, it is preferable to add to the water a little acid, such as for example formic acid, acetic acid, phosphoric acid, for the purpose of assisting the dissolution. The process takes place in other respects in the same way as described in Example 1.

(7) 25 kg. oats are mixed dry with 1 kg. per-phosphate with a content of 15% $H_2O_2$ and then mixed with 1 litre of water. A fine looking, clean and well sprouting seed material is obtained.

(8) 1 kg. of turnip seeds is thoroughly mixed dry with 100 gr. sodium per-carbonate with a content of 20% $H_2O_2$ whereupon 100 cc. water are added. After the addition of water, which releases the hydrogen peroxide, a considerable heat development takes place. The treated seeds show a substantially higher germinating capacity than the same seeds untreated. A similar effect is obtained by the same treatment with the use of sodium per-phosphate or sodium sulphate-$H_2O_2$. In addition to increasing the germinating capacity of the seeds, a destruction of fungi or spores and bacteria is obtained in every case.

(9) 10 kg. Indian corn grains are mixed with 1 kg. calcium peroxide or with a mixture of ½ kg. calcium peroxide and ½ kg. sodium per-carbonate. To the mixture is thereupon added about 1 litre of dilute phosphoric acid. In this case also heat is generated. The smut spores are completely killed thereby. The calcium oxide or calcium phosphate formed during the decomposition is used as a fertilizer for the plant.

(10) 10 kg. barley are mixed with ½ kg. sodium sulphate-$H_2O_2$ with a content of about 10% $H_2O_2$ whereupon ½ litre of water is added. An almost sterile seed material of a very good appearance is obtained.

I use the term true per-compounds to include not only $H_2O_2$ and its molecular compounds but also salts of acids which are either (1) formed by the action of $H_2O_2$ on the oxyacids, or (2)

give rise to $H_2O_2$ when treated with dilute sulphuric acid (true per-salts), furthermore true peroxides reacting with acids to give off $H_2O_2$, which behaviour is assumed to be caused by the two oxygen atoms being directly bound to each other.

I claim:

1. A process for treating seeds for sowing consisting in moistening the seeds with solutions of true percompounds of higher concentration than that corresponding to a content of 3% hydrogen peroxide.

2. A process for treating seeds for sowing consisting in moistening the seeds with solutions of true percompounds the concentration of which corresponds to a hydrogen peroxide concentration of 10% to 40%.

3. A process for treating seeds for sowing which consists in bringing the seeds to be treated into intimate contact with such a limited quantity of solutions of true percompounds of higher concentration than that corresponding to a content of 3% hydrogen peroxide, that the liquid is substantially evaporated by the heat generated by the decomposition of the percompounds and a practically dry material is obtained.

4. A process for treating seeds for sowing which consists in applying to the seeds an agent influencing the decomposition of true percompounds, and thereafter moistening the said pretreated seeds with a solution of a true percompound.

5. A process for treating seeds for sowing which consists in applying to the seeds a catalyst promoting the decomposition of true percompounds, and thereafter moistening the seeds with a solution of a true percompound.

6. A process for treating seeds for sowing which consists in preliminary pickling the seeds with a catalytically acting disinfectant, and thereafter subjecting the said pretreated seeds to the action of a concentrated solution of a true percompound.

7. A process for treating seeds for sowing which consists in moistening the said seeds with hydrogen peroxide solutions of more than 10% $H_2O_2$.

8. A process for treating seeds for sowing which consists in moistening the said seeds with acid reacting solutions of a true percompound.

9. A process for treating seeds for sowing which consists in uniformly distributing in the said seeds a solid true percompound, and thereafter moistening the seeds with water.

10. A process for treating seeds for sowing which consists in uniformly distributing in the said seeds a solid true percompound, and thereafter moistening the seeds with acidulated water.

11. A process for treating seeds for sowing which consists in intimately mixing said seeds with an aqueous solution in an amount of less than 15% of the weight of the seeds and containing a true percompound in a higher concentration than that corresponding to a content of 3% hydrogen peroxide.

12. A process for treating seeds for sowing which consists in moistening the seeds with solutions of agents of the class including hydrogen peroxide and its molecular compounds, the said solutions containing more than 3% $H_2O_2$, and allowing the said solutions to decompose in intimate contact with the seeds.

13. A process for treating seeds for sowing which consists in moistening the seeds with solutions of true per-salts of the class including per-carbonates, per-sulphates, per-phosphates and per-arsenates, the said solutions having a concentration higher than that corresponding to a content of 3% hydrogen peroxide, and allowing the said solutions to decompose in intimate contact with the seeds.

14. A process for treating seeds for sowing which consists in moistening the seeds with solutions of true peroxides of the class including calcium peroxide, magnesium peroxide, barium peroxide and strontium peroxide, the said solutions having a concentration higher than that corresponding to a content of 3% hydrogen peroxide, and allowing the said solutions to decompose in intimate contact with the seeds.

15. A process for treating seeds for sowing which consists in subjecting the seeds to the action of solutions of organic hydrogen peroxide molecular compounds, and allowing the solutions to decompose in contact with the seeds.

16. A process for treating seeds for sowing with hydrogen peroxide wherein acid solutions of hydrogen peroxide are employed.

17. A process for treating seeds for sowing with hydrogen peroxide wherein alkaline solutions of hydrogen peroxide are employed.

18. A process for treating seeds for sowing with hydrogen peroxide wherein the seeds are subjected to the action of vapor of hydrogen peroxide.

19. A process for treating seeds for sowing with hydrogen peroxide wherein the hydrogen peroxide is brought in contact with the seeds in an atomized state.

20. A process for treating seeds for sowing which consists in uniformly distributing the said seeds in a solution of a true percompound, the amount of the liquid not substantially exceeding 15% of the weight of the seeds treated, the concentration of the said solution being higher than that corresponding to a content of 3% hydrogen peroxide.

JOSEF MÜLLER.